United States Patent
Watanabe et al.

(10) Patent No.: US 6,768,513 B1
(45) Date of Patent: Jul. 27, 2004

(54) DEFICIENT PIXEL DETECTION METHOD AND IMAGE SIGNAL PROCESSOR

(75) Inventors: Tohru Watanabe, Ogaki (JP); Masato Teratani, Gifu-ken (JP)

(73) Assignee: Sanyo Electric Co., Ltd., Osaka (JP)

(*) Notice: Subject to any disclaimer, the term of this patent is extended or adjusted under 35 U.S.C. 154(b) by 852 days.

(21) Appl. No.: 09/680,705

(22) Filed: Oct. 6, 2000

(30) Foreign Application Priority Data

Oct. 7, 1999 (JP) .......................................... 11-287117

(51) Int. Cl.$^7$ .............................................. H04N 9/64
(52) U.S. Cl. ...................................... 348/246; 348/247
(58) Field of Search ................................ 348/241, 245, 348/246, 247, 606, 607, 619, 627; 375/240.27, 240.29; 382/266, 268, 269, 275; 345/611, 612, 616; 386/47, 50, 51; 358/518

(56) References Cited

U.S. PATENT DOCUMENTS

| | | | | |
|---|---|---|---|---|
| 4,484,230 A | * | 11/1984 | Pugsley | 358/447 |
| 4,573,070 A | * | 2/1986 | Cooper | 348/617 |
| 5,050,223 A | * | 9/1991 | Sumi | 382/266 |
| 5,121,447 A | * | 6/1992 | Tanioka et al. | 382/268 |
| 5,729,624 A | * | 3/1998 | Tanioka et al. | 382/162 |
| 5,784,491 A | * | 7/1998 | Koga | 382/232 |
| 5,974,196 A | * | 10/1999 | Chang et al. | 382/268 |
| 6,115,420 A | * | 9/2000 | Wang | 375/240.03 |
| 6,115,504 A | * | 9/2000 | Kumashiro | 382/273 |
| 6,252,995 B1 | * | 6/2001 | Takamori | 382/254 |
| 6,332,045 B1 | * | 12/2001 | Sawada et al. | 382/272 |
| 6,381,374 B1 | * | 4/2002 | Pourjavid | 382/275 |
| 6,411,377 B1 | * | 6/2002 | Noguchi et al. | 356/237.4 |
| 6,529,622 B1 | * | 3/2003 | Pourjavid | 382/149 |
| 6,618,494 B1 | * | 9/2003 | Nonay et al. | 382/132 |
| 2003/0020974 A1 | * | 1/2003 | Matsushima | 358/521 |

\* cited by examiner

Primary Examiner—Vu Le
Assistant Examiner—Yogesh Kumar Aggarwal
(74) Attorney, Agent, or Firm—Fish & Richardson P.C.

(57) ABSTRACT

An image signal processor detects deficient pixels, such as pixels having a white deficiency or a black deficiency, and corrects the image signal so that the pixel deficiency is not reproduced. A memory circuit holds a target pixel signal and peripheral signals, which correspond to the pixels adjacent to the target pixel. A deficiency detection circuit compares the level of the target pixel signal with the levels of the peripheral pixel signals to detect whether the target pixel is deficient. A deficiency correction circuit corrects the signal of a detected deficient pixel using information from nearby pixels.

10 Claims, 5 Drawing Sheets

DEFICIENT PIXEL DETECTION METHOD AND IMAGE SIGNAL PROCESSOR

BACKGROUND OF THE INVENTION

The present invention relates to a deficient pixel detecting method and an image processing apparatus, and more particularly, to a method for detecting a deficient pixel signal included in an image signal and an image processing apparatus for correcting a deficient pixel using the detection method.

In a solid-state image sensor, such as a CCD image sensor, a deficiency may occur in a pixel such that the pixel stores a constant amount of charge regardless of the level of the received light and outputs an image signal having a fixed level. To prevent the deficient pixel from affecting the reproduced image, the image signals obtained from the solid-state imaging device undergo a deficiency correction process.

FIG. 1 is a schematic block diagram of an imaging apparatus that performs a pixel deficiency correction process. The imaging apparatus 100 includes a CCD image sensor 1, a driver 2, a timing control circuit 3, a signal processor 4, a deficiency correction circuit 5, and a correction information memory 6.

The image sensor 1 includes a plurality of light receiving pixels (not shown) that are arranged in a matrix. A charge corresponding to the received light of a subject image is stored in each pixel. In accordance with a vertical drive signal $\phi V$ and a horizontal drive signal $\phi H$, the image sensor 1 sequentially transfers the charges stored in the light receiving pixels in single line units and generates an image signal Y0 having a predetermined format.

The driver 2 generates the vertical drive signal $\phi V$ in accordance with a vertical synchronizing signal VD and generates the horizontal drive signal $\phi H$ in accordance with a horizontal synchronizing signal HD. Further, the driver 2 provides the signals $\phi V$, $\phi H$ to the image sensor 1 to drive the image sensor 1.

The timing control circuit 3 divides a reference clock, which has a predetermined frequency, generates the vertical synchronizing signal VD, which determines a vertical scan timing, and the horizontal synchronizing signal HD, which determines a horizontal scan timing, and provides the synchronizing signals VD, HD to the driver 2. For example, when the NTSC format is used, a reference clock having a frequency of 14.32 MHz is divided by 910 to generate the horizontal synchronizing signal HD, and the signal HD is divided by 525/2 to generate the vertical synchronous signal VD. Further, the timing control circuit 3 provides the signal processor 4 and the deficiency correction circuit 5 with timing signals that are synchronized with the operation timing of the image sensor 1.

The signal processor 4 performs a sample and hold process and a level correction process on the image signal Y0 provided from the image sensor 1 to generate an image signal Y1. The image signal Y0 alternates between a signal level and a reset level. Thus, for example, during the sample and hold process, the signal processor 4 clamps the reset level and extracts the signal level to generate the image signal Y1 having the signal level from the image signal Y0. Further, during the level correction process, the signal processor 4 performs gain feedback control on the image signal Y0 so that the average level of the image signal Y1 is within a target range. The signal processor 4 sample and holds the image signal Y0 and performs digital processing by A/D converting the sample hold value.

The deficiency correction circuit 5 performs a deficiency correction process on the image signal Y1 in accordance with correction information stored in the correction information memory 6. For example, the information of a deficient pixel is replaced by an average value taken from the preceding and following pixels.

The position of the deficient pixel in the image sensor 1 is stored in the correction information memory 6. For example, the output of the image sensor 1 is monitored to detect the position of the deficient pixel, and the detection result is stored as correction address information in the memory 6.

When a plurality of the CCD image sensors 1 are manufactured from the same semiconductor substrate, the location of a deficient pixel may differ between image sensors 1. Thus, the position of deficient pixels must be detected for each image sensor 1 to generate the correction address information. This increases the cost of the assembly process.

As time passes by, the number of deficient pixels in the image sensor 1 may increase. When such change occurs, the correction address information of the correction information memory 6 must be rewritten. However, a user of the imaging apparatus 100 normally does not have the means to rewrite the correction address information.

SUMMARY OF THE INVENTION

It is an object of the present invention to provide a deficient pixel detection method and an image signal processor that adapts to changes of the deficient pixels that occur as time passes by.

To achieve the above object, the present invention provides a method for detecting a deficient pixel from a plurality of pixels. The method includes the steps of computing an average level of signals generated by peripheral pixels that are adjacent to a target pixel, detecting a maximum level and a minimum level of the signals of the peripheral pixels, computing a difference value between the maximum level and the minimum level, generating a first reference value by adding the difference value to the average level and a second reference value by subtracting the difference value from the average level, and determining that the target pixel is deficient when a level of a signal of the target pixel is at least one of greater than the first reference value and less than the second reference value.

A further aspect of the present invention provides an image signal processor for processing a plurality of pixel signals. The image signal processor includes a memory circuit for storing a target pixel signal and peripheral signals corresponding to peripheral pixels that are adjacent to the target pixel and a deficiency detection circuit connected to the memory circuit to compare the level of the target pixel signal with the levels of the peripheral pixel signals to detect whether the target pixel is deficient. The deficiency detection circuit adds a difference value between a maximum level and a minimum level of the peripheral pixel signals to an average level of the peripheral pixel signals to generate a first reference value and subtracts the difference value from the average level to generate a second reference value. The deficiency detection circuit compares the first and second reference values with the level of the target pixel signal to determine the deficiency of the target pixel. A deficiency correction circuit is connected to the deficiency detection circuit to correct the signal of the deficient target pixel.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENT

Figure 1:
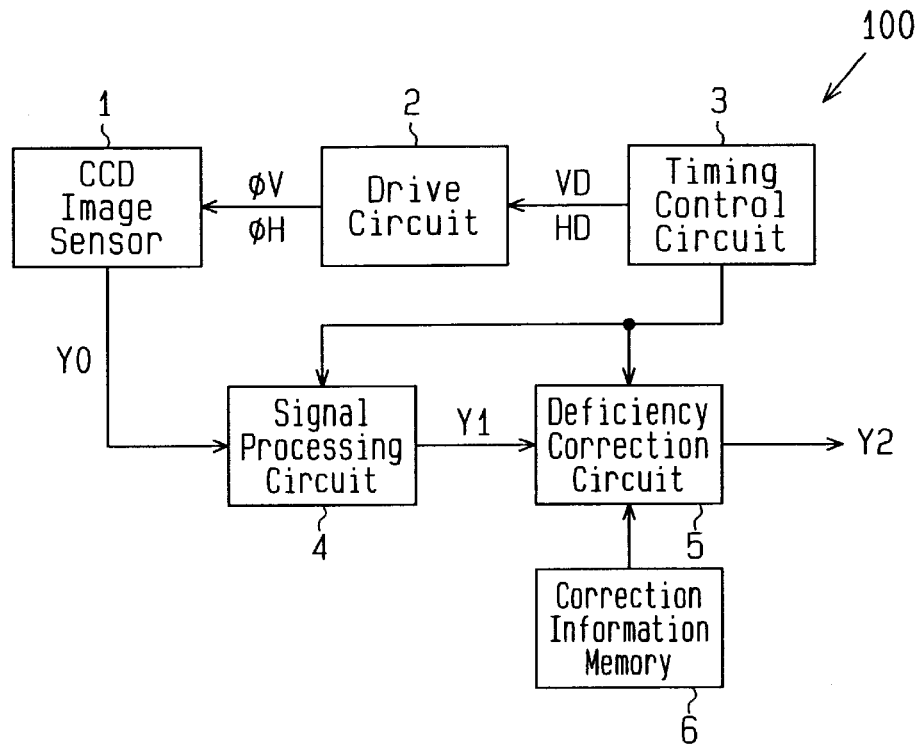
FIG. 1 is a schematic block diagram showing a prior art solid-state imaging device.
Figure 2:
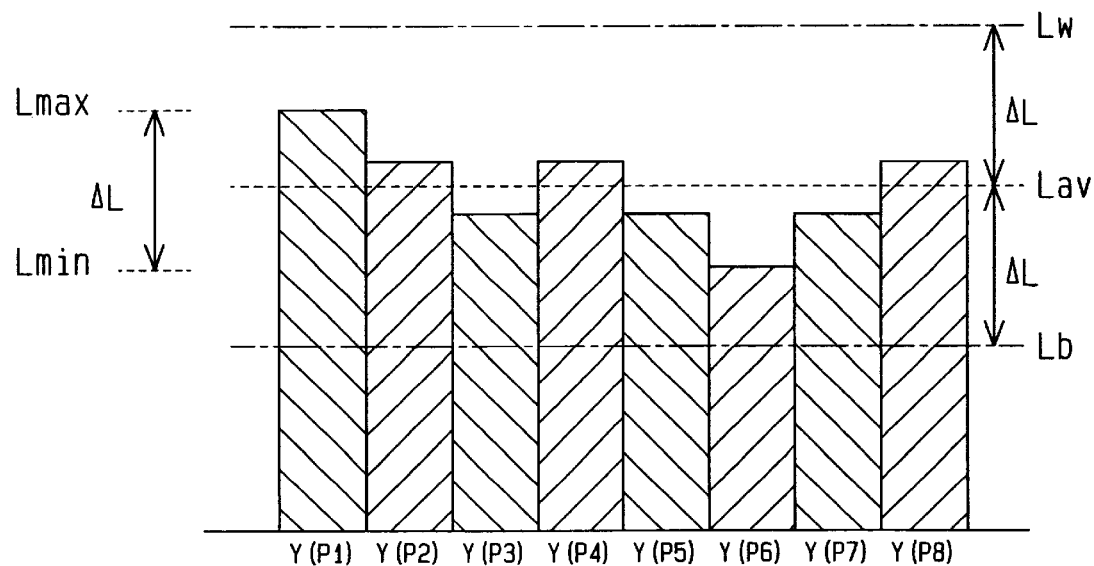
FIG. 2 is a chart used in a deficient pixel detection method according to a preferred embodiment of the present invention showing the relationship between a reference value and the level of peripheral pixels.

In the drawings, like numerals are used for like elements throughout. FIG. 2 is a chart used to describe a deficient pixel detection method according to a preferred embodiment of the present invention.

Figure 3:
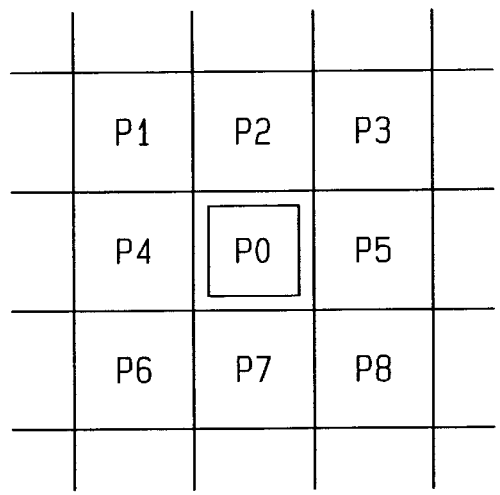
FIG. 3 is a diagram showing the positional relationship between a target pixel and peripheral pixels.

FIG. 2 shows the relationship between the levels of image signals representing pixels peripheral to a target pixel and a reference value, which is computed from the image signal levels, for determining the occurrence of pixel deficiencies. In the detection method of the preferred embodiment, as shown in FIG. 3, it is determined whether a target pixel P0 has a deficiency by referring to eight peripheral pixels P1–P8 that are adjacent to the target pixel P0.

In a first step, an average level Lav of eight image signals Y(P1) to Y(P8) respectively corresponding to the peripheral pixels P1–P8 is computed.

In a following second step, a maximum level Lmax and a minimum level Lmin of the image signals Y(P1) to Y(P8) are determined.

In a third step, the minimum level Lmin is subtracted from the maximum level Lmax to compute a difference ΔL between the two levels.

In a fourth step, the average level Lav is added to the difference ΔL to generate a first reference value Lw for detecting white deficiencies.

In a fifth step, the difference ΔL is subtracted from the average level Lav to generate a second reference value Lb for determining black deficiencies. The order of the first and second steps or the fourth and fifth steps may be reversed.

The first reference value Lw and the second reference value Lb, which are generated in the first to fifth steps, are varied in accordance with the status of the peripheral pixels and thus maintained at an optimal value.

The first and second reference values Lw, Lb move closer to the average level Lav when the level difference ΔL is small and farther from the average level Lav when the level difference ΔL is large. Accordingly, the range of the first and second reference values Lw, Lb is narrow at sections of the display where the difference in contrast is small and wide at sections where the contrast difference is large. As a result, deficient pixels that are visually noticeable in each pixel section are efficiently detected.

A further sixth step may be provided so that an offset value corresponding to the levels of the image signals Y(P1) to Y(P8) is added to the first reference value Lw and subtracted from the second reference value Lb. A white deficiency is noticeable in a dark section of a displayed image but not noticeable in a bright section. Thus, a relatively large offset value is added to the first reference value Lw when the average level Lav of the peripheral pixels is relatively high, and a relatively small offset value is added to the first reference value Lw when the average level Lav is relatively low.

A black deficiency is noticeable in a bright section of the displayed image but not noticeable in a dark section. Thus, a relatively large offset value is subtracted from the second reference value Lb when the average level Lav of the peripheral pixels is relatively low, and a relatively small offset value is subtracted from the second reference value Lb when the average level Lav is relatively high. The offset value may be determined in accordance with the average level of the image signals Y(P1) to Y(P8) or in accordance with the gain level of when the image signals are processed. Alternatively, these two methods may be combined to determine the offset value. The employment of the offset value further improves the efficiency for detecting deficient pixels that are visually noticeable.

The first reference value Lw is compared with an image signal Y(P0) representing the target pixel P0. When the image signal Y(P0) exceeds the first reference value, the target pixel P0 is determined as having a white deficiency. In the same manner, the second reference value Lb is compared with the image signal Y(P0). When the image signal Y(P0) is lower than the second reference value Lb, the target pixel P0 is determined as having a black deficiency.

Successive image signals Y(n) in single line units are analyzed one at a time to determine whether they represent deficient pixels. When the occurrence of a deficiency is determined, the pixel deficiency is synchronously corrected. Thus, the correction of pixel deficiencies is facilitated. Alternatively, the output timing of image signals determined as having pixel deficiencies is stored as address information that is based on horizontal scanning line numbers and pixel numbers. From the next field, pixel deficiencies may be corrected based on the address information. In this case, the address information indicating the position of deficient pixels may be updated for every predetermined number of fields to adapt to changes in deficient pixels.

In the deficient pixel detection method of the preferred embodiment, the positions of deficient pixels do not have to be detected during manufacturing. Thus, a process for detecting the position of deficient pixels may be eliminated thereby saving manufacturing costs. Further, the detection of deficient pixels is performed continuously in accordance with the acquired image signals. Thus, the proper positions of deficient pixels are always detected regardless of whether the number of deficient pixels increases or decreases over time.

Figure 4:
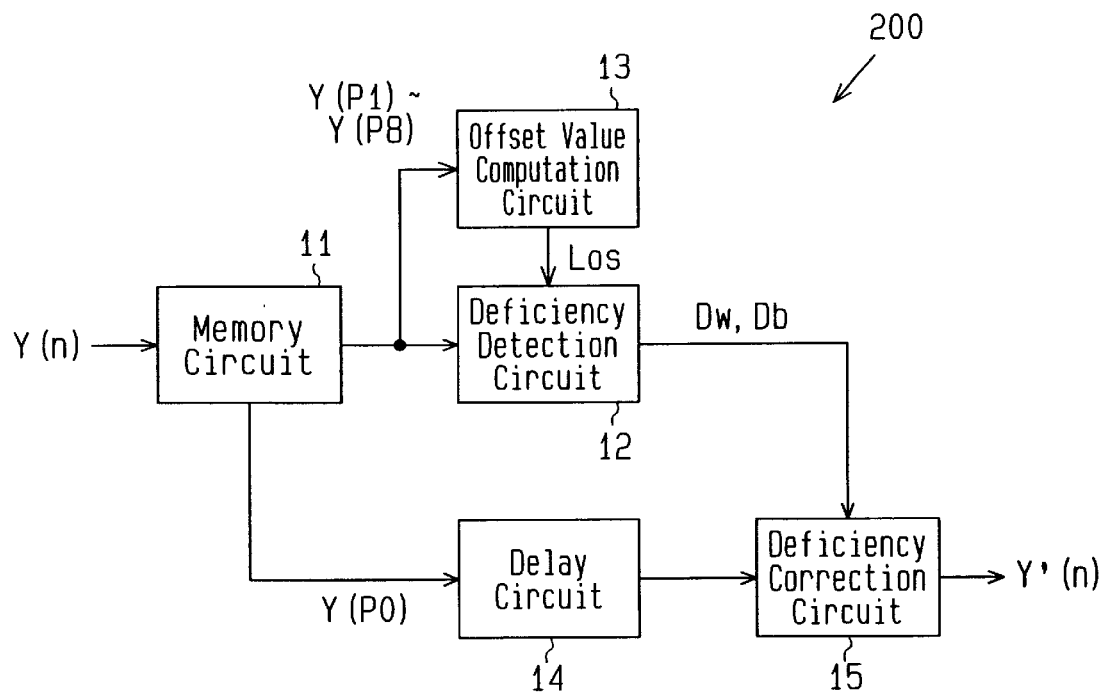
FIG. 4 is a schematic block diagram showing an image signal processor according to the preferred embodiment of the present invention.

FIG. 4 is a schematic block diagram showing an image signal processor 200 employing the deficient pixel detection method of the preferred embodiment.

The image signal processor 200 includes a memory circuit 11, a deficiency detection circuit 12, an offset value computation circuit 13, a delay circuit 14, and a deficiency correction circuit 15. The image signal processor 200 processes the output signal of a CCD image sensor, and then generates a digital image signal Y(n) by A/D converting the processed signal. Further, the image signal processor 200 performs a pixel deficiency correction process on the image signal Y(n).

The memory circuit 11, which includes a plurality of line memories and a plurality of latches, receives the image signals Y(n) in single line units and synchronously generates the image signal Y(P0) corresponding to the target pixel P0 and the image signals Y(P1) to Y(P8) respectively corresponding to the peripheral pixels P1–P8.

The deficiency detection circuit 12 generates the first reference value Lw, which is used to determine white deficiencies, and the second reference value Lb, which is used to determine black deficiencies, based on the image signals Y(P1) to Y(P8) of the peripheral pixels P1–P8 provided from the memory circuit 11. The deficiency detection circuit 12 compares the first and second reference values Lw, Lb with the image signal Y(P0) to detect deficient pixels.

In the preferred embodiment, the deficiency detection circuit 12 adds a first offset value Los, which is provided by the offset value computation circuit 13, to the first reference value Lw and subtracts a second offset value Los from the second reference value Lb. The first offset value Los and the second offset value Los are preferably equal. The deficiency detection circuit 12 compares each of the image signals Y(P0) with the offset reference values Lw, Lb and, when the level of the image signal Y(P0) exceeds the reference value Lw, generates a detection signal Dw indicating the detection of a white deficiency. If the level of the image signal Y(P0) is lower than the offset reference value Lb, the deficiency detection circuit 12 generates a detection signal Db indicating the detection of a black deficiency.

The offset value computation circuit 13 computes the offset value Los applied to the first and second reference values Lw, Lb in accordance with the image signals Y(P1) to Y(P8). The offset value computation circuit 13 computes the offset value Los by, for example, multiplying the average lebel Lav of the image signals Y(P1) to Y(P8) with a predetermined coefficient or by referring to a predetermined conversion table.

The offset value Los may be computed in accordance with the gain added to the image signals Y(n) when generating the image signals Y(n) or in accordance with the gain and the average level Lav of the image signals Y(P1) to Y(P8).

The delay circuit 14 acquires each of the image signals Y(P0) from the memory circuit 11 and delays the acquired image signal Y(P0) for a predetermined time, which is required for the processing by the deficiency detection circuit 12, to match the output timing of the image signal Y(P0) with the output timings of the detections signals Dw, Db.

The deficiency correction circuit 15 replaces the image signal Y(P0) with a correction signal Y(c) in synchronism with the rise timing of the detection signals Dw, Db. The correction signal Y(c) is generated by, for example, equalizing the image signals Y(P2), Y(P7) of the respective pixels P2, P7 located above and below the target pixel P0 and the image signals Y(P4), Y(P5) of the respective pixels P4, P5 located at the left and right sides of the target pixel P0. Accordingly, if the deficiency detection circuit 12 determines that the target pixel P0 has a white deficiency or a black deficiency, the deficiency correction circuit 15 replaces the image signal Y(P0) with the correction signal Y(c). The deficiency correction circuit 15 then outputs an image signal Y'(n), which white or black deficiency is corrected.

Figure 5:
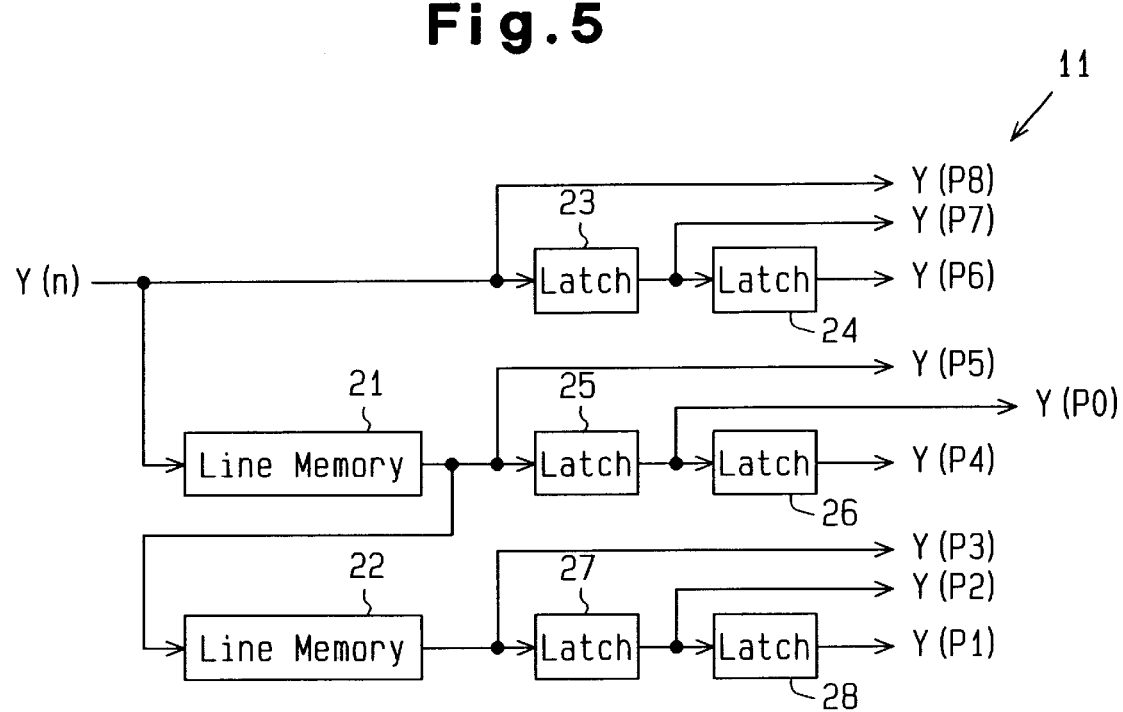
FIG. 5 is a schematic block diagram showing a memory circuit of the image signal processor of FIG. 4.

FIG. 5 is a schematic block diagram showing an example of the memory circuit 11. The memory circuit 11 includes first and second line memories 21, 22 and first to sixth latches 23 to 28.

The first and second line memories 21, 22 are connected in series with respect to the provided image signals Y(n). The image signals Y(n) are written to the first line memory 21, and the image signals Y(n) read sequentially from the first line memory 21 are written to the second line memory 22. As a result, when the image signals Y(n) are sequentially provided, the image signals Y(n) of the preceding line are read from the first line memory 21, and the image signals Y(n) of the line before the preceding one are read from the second line memory 22.

The first and second latches 23, 24 are connected in series with respect to the provided images signals Y(n). The image signal Y(n) of the pixel preceding the present one is held by the first latch 23, and the image signal Y(n) of the pixel just before the preceding one is held by the second latch 24. With reference to FIG. 5, assuming that the present output image signal Y(n) is the image signal Y(P8), which corresponds to the pixel P8, the image signals Y(P7), Y(P6) corresponding to the pixels P7, P6 are output from the first and second latches 23, 24, respectively.

The third and fourth latches 25, 26 are connected in series with respect to the image signals Y(n) provided from the first line memory 21. The image signal Y(n) corresponding to one line and one pixel before the present pixel is held by the third latch 25. The image signal Y(n) corresponding to one line and two pixels before the present pixel is held by the fourth latch 26. Thus, in the example of FIG. 5, the image signal Y(P5) corresponding to the pixel P5 is output from the first line memory 21. Further, the image signal Y(P0) corresponding to the target pixel P0 is output from the third latch 25, and the image signal Y(P4) corresponding to the pixel P4 is output from the fourth latch 26.

In the same manner, the fifth and sixth latches 27, 28 are connected in series with respect to the image signals Y(n) provided from the second line memory 22. The image signal Y(n) corresponding to two lines and one pixel before the present pixel is held by the fifth latch 27. The image signal Y(n) corresponding to two lines and two pixels before the present pixel is held by the sixth latch 28. Thus, in the example of FIG. 5, the image signal Y(P3) corresponding to the pixel P3 is output from the second line memory 22. Further, the image signal Y(P2) corresponding to the target pixel P2 is output from the fifth latch 27, and the image signal Y(P1) corresponding to the pixel P1 is output from the sixth latch 28.

From the image signals Y(n), the memory circuit 11 generates the image signal Y(P0) of the target pixel P0 and the image signals Y(P1) to Y(P8) of the peripheral pixels P1–P8. The image signal Y(P0) is generated parallel to the image signals Y(P1) to Y(P8).

Figure 6:
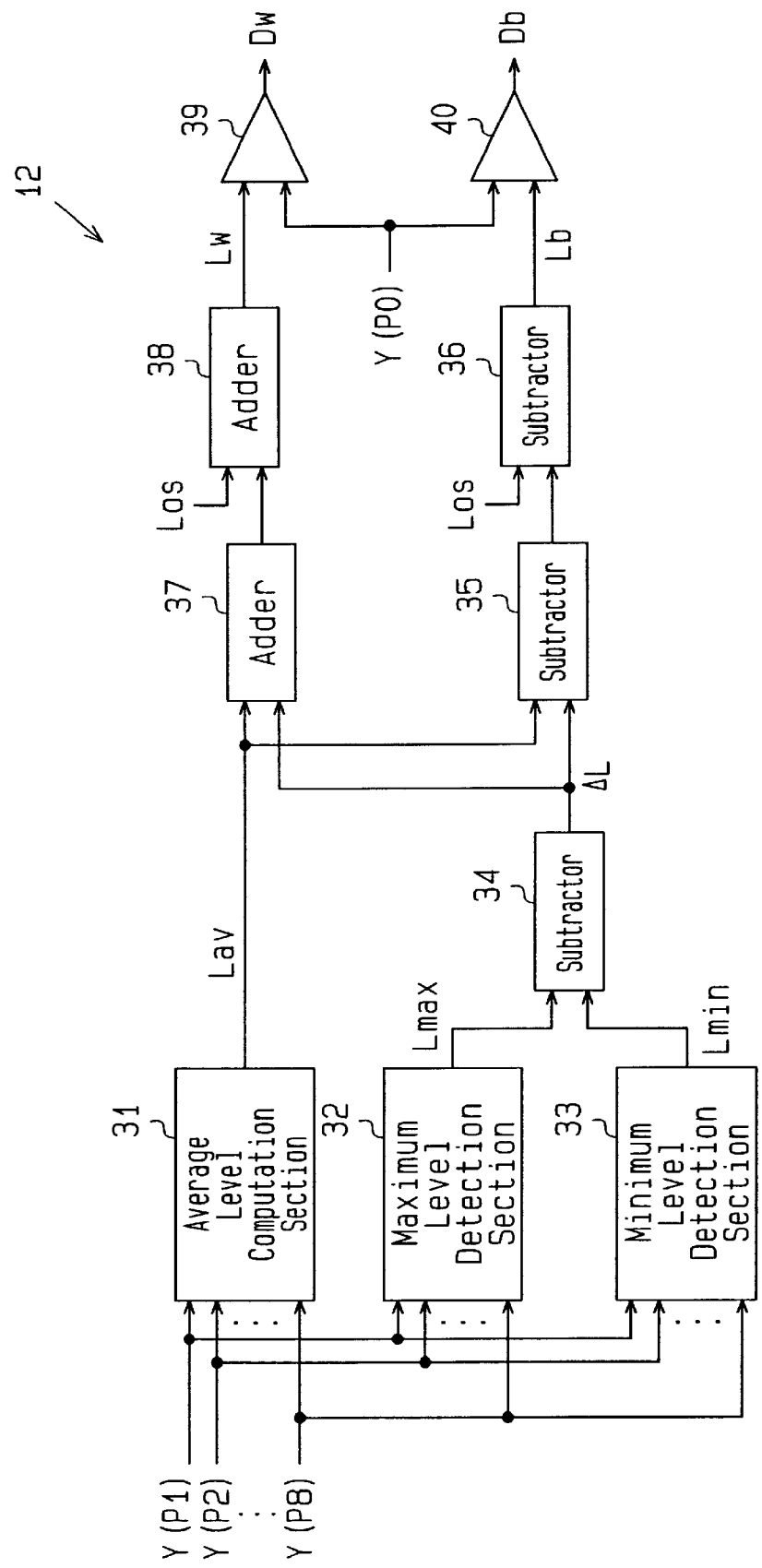
FIG. 6 is a schematic block diagram showing a deficiency detection circuit of the image signal processor of FIG. 4.

FIG. 6 is a schematic block diagram of the deficiency detection circuit 12. The deficiency detection circuit 12 includes an average lebel computation section 31, a maximum lebel detection section 32, a minimum lebel detection section 33, first to third subtractors 34 to 36, first and second adders 37, 38, and first to second comparators 39, The average lebel computation section 31 acquires the image signals Y(P1) to Y(P8) of the peripheral pixels P1 to P8 and computes the average level Lav of the image signals Y(P1) to Y(P8).

The maximum lebel detection section 32 and the minimum lebel detection section 33 detects the maximum level Lmax and the minimum level Lmin, respectively, of the image signals Y(P1) to Y(P8).

The first subtractor 34 subtracts the minimum level Lmin, which is provided from the minimum lebel detection section 33, from the maximum level Lmax, which is provided from the maximum lebel detection section 32, to generate a level difference ΔL.

The first adder 37 adds the level difference ΔL to the average level Lav provided from the average lebel computation section 31. The second subtractor 35 subtracts the level difference ΔL from the average level Lav. The second adder 38 adds the offset value Los to the sum obtained by the first adder 37 to generate a first offset reference value Lw for determining the occurrence of a white deficiency.

The third subtractor 36 subtracts the offset level Los from the level difference ΔL obtained by the second subtractor 35 to generate a second offset reference value Lb for determining the occurrence of a black deficiency.

The first comparator 39 compares the first offset reference value Lw, which is provided from the second adder 38, with the image signal Y(P0) of the target pixel P0 and causes the detection signal Dw to go high when the level of the image signal Y(P0) exceeds the reference value Lw. The first comparator 39 generates the high detection output Dw when determining that the target pixel P0 has a white deficiency.

The second comparator 40 compares the second offset reference value Lb, which is provided from the third subtractor 36, with the image signal Y(P0) of the target pixel P0 and causes the detection signal Db to go high when the level of the image signal Y(P0) exceeds the reference value Lb. The second comparator 40 generates the high detection signal Db when determining that the target pixel P0 has a black deficiency.

The deficiency detection circuit 12 sequentially determines whether each of the image signals Y(P0) has a white deficiency or a black deficiency in accordance with the image signals Y(P1) to Y(P8) provided from the memory circuit 11 and generates the high detection signals Dw, Db when there is a deficiency.

Figure 7:
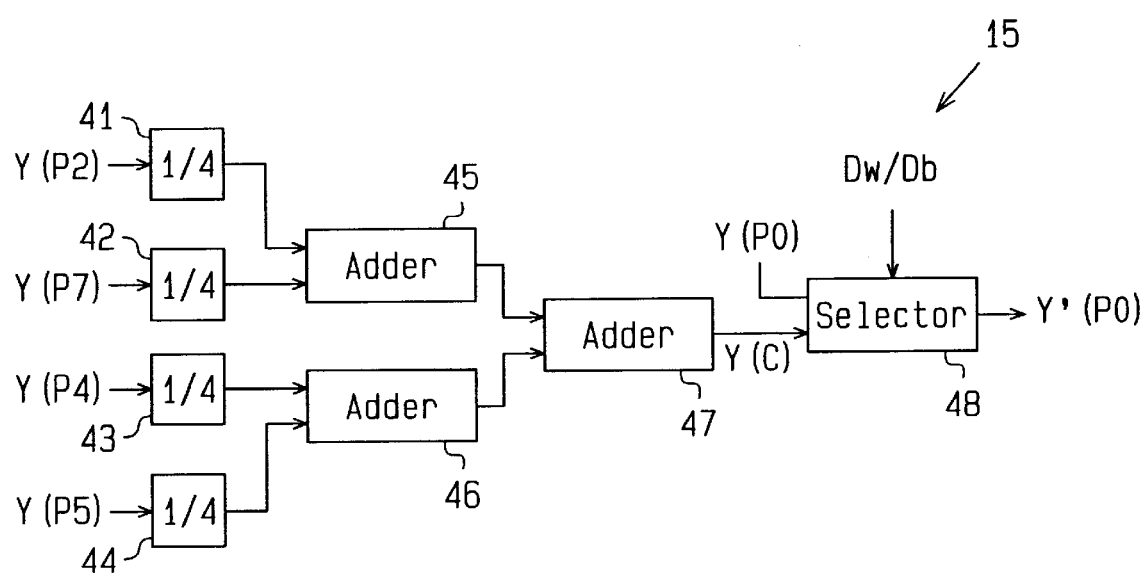
FIG. 7 is a schematic block diagram of a deficiency correction circuit of the image signal processor of FIG. 4.

FIG. 7 is a schematic block diagram of the deficiency correction circuit 15. The deficiency correction circuit 15 includes first to fourth dividers 41 to 44, first to third adders 45 to 47, and a selector 48. The deficiency correction circuit 15 shown in FIG. 7 generates the correction signal Y(c) using the image signals Y(P2), Y(P7) of the respective pixels P2, P7 located above and below the target pixel P0 and the image signals Y(P4), Y(P5) of the respective pixels P4, P5 located at the left and right sides of the target pixel P0.

The first to fourth dividers 41 to 44 respectively divide the images signals Y(P2), Y(P7), Y(P4), Y(P5) by four.

The first adder 45 adds the division results of the first and second dividers 41, 42. The second adder 46 adds the division results of the third and fourth dividers 43, 44.

The third adder 47 adds the sum obtained by the first adder 45 and the sum obtained by the second adder 46 to generate the correction signal Y(c).

In response to the detection signals Dw, Db provided by the deficiency detection circuit 12, the selector 48 selects either one of the image signal Y(P0) and the correction signal Y(c) and, when selecting the correction signal Y(c), generates the image signal Y'(P0). That is, the selector 48 selects the image signals Y(P0) when the pixels are functioning normally and neither of the detection outputs Dw, Db has risen, and selects the correction signal Y(c) when one of the detection outputs Dw, Db rises. Thus, when the image signal Y(n) indicates deficiency of the corresponding pixel, the image signal Y(n) is corrected by the correction signal Y(c) in accordance with the detection signals Dw, Db.

The pixel detection method and the image processing apparatus of the preferred and illustrated embodiment has the advantages described below.

Signals indicating deficient pixels that are included in the successive input image signals are sequentially detected. Since the reference value used to determine the occurrence of a pixel deficiency is varied in accordance with the state of the peripheral images, erroneous detections in high brightness sections and low brightness sections are prevented. As a result, deficient pixels that are visually noticeable in a reproduced image are efficiently detected.

The signals of deficient pixels that are sequentially detected are corrected. Thus, the position of deficient pixels do not have to be detected beforehand and stored. This simplifies initialization with regard to the detection of deficient pixels. In addition, when the number of deficient pixels increases over time, the signal of the deficient pixel is corrected without having to change information related with deficient pixel positions.

It should be apparent to those skilled in the art that the present invention may be embodied in many other specific forms without departing from the spirit or scope of the invention. Particularly, it should be understood that the present invention may be embodied in the following forms.

The first and second reference values Lw, Lb may be set in accordance with the levels of 14 peripheral pixels in a 3×5 array or in accordance with the levels of 24 peripheral pixels in a 5×5 array.

The first offset value Los and the second offset value Los may be different values.

The present examples and embodiments are to be considered as illustrative and not restrictive, and the invention is not to be limited to the details given herein, but may be modified within the scope and equivalence of the appended claims.

What is claimed is:

1. A method for detecting a deficient pixel from a plurality of pixels, the method comprising the steps of:

computing an average level of signals generated by peripheral pixels that are adjacent to a target pixel;

detecting a maximum level and a minimum level of the signals of the peripheral pixels;

computing a difference value between the maximum level and the minimum level;

generating a first reference value by adding the difference value to the average level and a second reference value by subtracting the difference value from the average level; and determining that the target pixel is deficient when a level of a signal of the target pixel is at least one of greater than the first reference value and less than the second reference value.

2. The method for detecting deficient pixels according to claim 1, further comprising the step of:

correcting the signal of the deficient target pixel using the signals of the peripheral pixels.

3. The method for detecting deficient pixels according to claim 1, further comprising the steps of:

adding a first offset value to the first reference value; and subtracting a second offset value from the second reference value.

4. The method for detecting deficient pixels according to claim 3, wherein the first and second offset values are determined in accordance with the average level.

5. The method for detecting deficient pixels according to claim 4, further comprising the step of:
   correcting the signal of the deficient target pixel using the signals of the peripheral pixels.

6. An image signal processor for processing a plurality of pixel signals, comprising:
   a memory circuit for storing a target pixel signal and peripheral signals corresponding to peripheral pixels that are adjacent to the target pixel;
   a deficiency detection circuit connected to the memory circuit to compare the level of the target pixel signal with the levels of the peripheral pixel signals to detect whether the target pixel is deficient, wherein the deficiency detection circuit adds a difference value between a maximum level and a minimum level of the peripheral pixel signals to an average level of the peripheral pixel signals to generate a first reference value and subtracts the difference value from the average level to generate a second reference value, the deficiency detection circuit comparing the first and second reference values with the level of the target pixel signal to determine the deficiency of the target pixel; and
   a deficiency correction circuit connected to the deficiency detection circuit to correct the signal of the deficient target pixel.

7. The image signal processor according to claim 6, wherein the deficiency correction circuit corrects the signal of the deficient target pixel using the peripheral pixel signals.

8. The image signal processor according to claim 6, wherein the deficiency correction circuit includes:
   an offset adding circuit for adding a first offset value, which is determined in accordance with the levels of the peripheral pixel signals, to the first reference value to generate a first offset reference value; and
   an offset subtracting circuit for subtracting a second offset value, which is determined in accordance with the levels of the peripheral pixel signals, to the second reference value to generate a second offset reference value.

9. The image signal processor according to claim 8, further comprising an offset computation circuit connected to the memory circuit for generating the first and second offset values in accordance with the average level of the peripheral pixel signals.

10. The image signal processor according to claim 9, wherein the deficiency correction circuit corrects the signal of the deficient target pixel using the peripheral pixel signals.

* * * * *